US012589587B2

(12) United States Patent
Suematsu et al.

(10) Patent No.: US 12,589,587 B2
(45) Date of Patent: Mar. 31, 2026

(54) PRINTING APPARATUS, CONTROL METHOD OF PRINTING APPARATUS, AND STORAGE MEDIUM

(71) Applicant: CANON KABUSHIKI KAISHA, Tokyo (JP)

(72) Inventors: Yushi Suematsu, Kanagawa (JP); Daisuke Kobayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 270 days.

(21) Appl. No.: 18/458,198

(22) Filed: Aug. 30, 2023

(65) Prior Publication Data

US 2024/0075738 A1 Mar. 7, 2024

(30) Foreign Application Priority Data

Sep. 5, 2022 (JP) ................................ 2022-140632

(51) Int. Cl.
*B41J 2/045* (2006.01)

(52) U.S. Cl.
CPC ....... *B41J 2/04563* (2013.01); *B41J 2/04585* (2013.01)

(58) Field of Classification Search
CPC ................ B41J 2/04563; B41J 2/04585; B41J 2/04553; B41J 2/0458; B41J 2/14137; B41J 2002/14177; B41J 2002/14185; B41J 2/1404; B41J 2/14153; B41J 2/14; B41J 2/14016; B41J 2/14024; B41J 2/14032; B41J 2/14064; B41J 2/14088; B41J 2/14112; B41J 2/1412; B41J 2/14129; B41J 2/14145
See application file for complete search history.

(56) References Cited

U.S. PATENT DOCUMENTS 11,186,092 B2 11/2021 Kobayashi
11,207,884 B2 12/2021 Suematsu
2015/0009257 A1 1/2015 Endo
2022/0194080 A1 6/2022 Kobayashi

FOREIGN PATENT DOCUMENTS

JP 2019-025791 A 2/2019
WO WO2021153682 * 5/2021 ............. B41J 2/355

* cited by examiner

*Primary Examiner* — Kristal Feggins
(74) *Attorney, Agent, or Firm* — Venable LLP

(57) ABSTRACT

A printing apparatus includes: a control unit configured to control a first heating process and a second heating process and configured to control the first heating process and the second heating process to be performed before a printing head starts printing an image on printing medium that is a printing target, wherein the second heating process is performed after the first heating process and before the printing head prints the image, and wherein a first target temperature in the first heating process is higher than a second target temperature in the second heating process.

17 Claims, 10 Drawing Sheets

A CASE WHERE THE TIME PERIOD REQUIRED FOR THE CONVEYANCE PREPARATION OPERATION IS SHORT

A CASE WHERE THE TIME PERIOD REQUIRED FOR THE CONVEYANCE PREPARATION OPERATION IS LONG

A CASE WHERE THE TIME PERIOD REQUIRED FOR THE CONVEYANCE PREPARATION OPERATION IS SHORT

A CASE WHERE THE TIME PERIOD REQUIRED FOR THE CONVEYANCE PREPARATION OPERATION IS LONG

PRINTING APPARATUS, CONTROL METHOD OF PRINTING APPARATUS, AND STORAGE MEDIUM

BACKGROUND

Field

The present disclosure relates to a printing apparatus, a control method of a printing apparatus, and a storage medium.

Description of the Related Art

An inkjet printing apparatus that ejects ink onto a printing medium to print an image by driving printing elements while a printing head equipped with multiple printing elements for ejecting ink scans the printing medium has been known.

As one of the printing methods with an inkjet printing apparatus, there is a thermal system in which ink is ejected by use of heat energy generated by a heating element such as a heater. Since the physical properties of ink such as its viscosity and surface tension change with temperature, the thermal system requires the ink to be at an appropriate temperature. Therefore, in the thermal system, the temperature of the ink and the printing head may be adjusted prior to operations such as image printing so as to achieve a temperature (hereinafter referred to as a target temperature) at which an ink viscosity suitable for ejection can be realized.

In the method described in Japanese Patent Laid-Open No. 2019-025791, the temperature adjustment of the printing head is controlled not to be performed simultaneously with the driving of some motors in order to suppress an increase in power consumption. Further, in the method described in Patent Laid-Open No. 2019-025791, in order to avoid excessive heat accumulation, in a case where the number of times the printing head is heated exceeds the upper limit in the period between the paper discharging operation of the N-th sheet to the paper feeding operation of the (N+1)-th sheet, the heating is cancelled even though the temperature of the printing head has not reached the target temperature. Further, according to the description, in a case where the heating is cancelled, the printing head is heated until the temperature of the printing head reaches the target temperature in the period between the completion of the feeding of the (N+1)-th sheet and the start of the printing on the (N+1)-th sheet.

In Japanese Patent Laid-Open No. 2019-025791, the target temperature of the first heating, which is executed in the period between the paper discharging operation of the N-th sheet and the paper feeding operation of the (N+1)-th sheet, is the same as the target temperature of the second heating, which is executed in the period between the completion of the paper feeding operation of the (N+1)-th sheet and the start of the image printing on the (N+1)-th sheet.

The second heating is performed at a timing closer to the start of image printing by the printing head than to the first heating. Therefore, in the second heating, if the printing head is heated to the same temperature as the target temperature of the first heating, the printing head may be excessively heated at the start of image printing, which may have adverse effects on the image printing. Further, if the target temperature in the second heating is high, the time period required to heat the printing head to the target temperature increases, which may deteriorate the throughput.

SUMMARY

A printing apparatus of the present disclosure includes: a printing head configured to print an image by ejecting ink to a printing medium that has been conveyed; a heating unit configured to heat the printing head; and a control unit configured to control a first heating process and a second heating process and configured to control the first heating process and the second heating process to be performed before the printing head starts printing the image on the printing medium that is a printing target, each of the first heating process and the second heating process being a process in which the heating unit is made to perform heating so that a temperature of the printing head becomes a target temperature, wherein the second heating process is performed after the first heating process and before the printing head prints the image, and wherein a first target temperature in the first heating process is higher than a second target temperature in the second heating process.

Further features of the present disclosure will become apparent from the following description of exemplary embodiments with reference to the attached drawings.

DESCRIPTION OF THE EMBODIMENTS

Hereinafter, embodiments of the technique of the present disclosure are explained in detail with reference to the accompanying drawings.

First Embodiment

[Regarding the Configuration of the Printing Apparatus]

Figure 1:
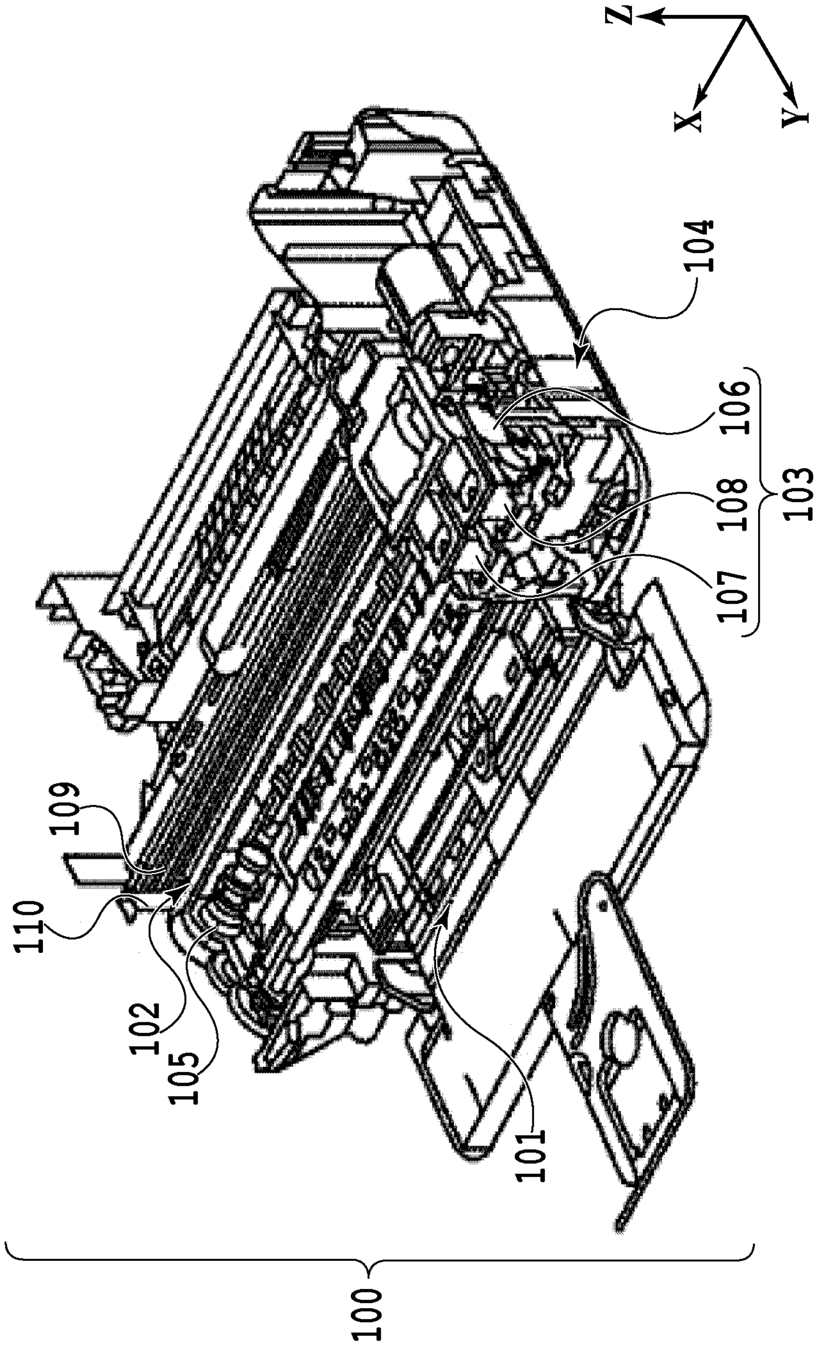
FIG. 1 is a schematic configuration diagram of a printing apparatus.

FIG. 1 is a perspective view diagram partially illustrating the internal configuration of the printing apparatus 100 of the present embodiment. As illustrated in FIG. 1, the printing apparatus 100 includes the paper feeding part 101, the conveyance part 102, the printing part 103, and the recovery part 104.

The paper feeding part 101 supplies a printing medium such as printing paper into the main body of the printing apparatus 100. The conveyance part 102 conveys the printing medium supplied by the paper feeding part 101 in the conveyance direction (— Y direction in the drawing). The printing part 103 prints an image on the printing medium, based on image data for printing. The recovery part 104 performs a recovery operation so as to maintain the ink ejecting performance of the printing heads 107 and 108 for retaining the quality of printed images. Hereinafter, a detailed explanation is given of each of the constituent elements.

The paper feeding part 101 performs a paper feeding operation to feed a printing medium into the printing apparatus 100. Specifically, printing media stacked on a paper feed tray of the paper feeding part 101 are picked up one by one by a paper feeding roller and a pickup roller driven by a motor, so as to be fed to the conveyance part 102. This operation of the paper feeding part 101 is referred to as a paper feeding operation. On an upstream position of the conveyance roller 105 included in the conveyance part 102, there is a sensor that functions as a detection unit for detecting an end portion of a printing medium, so that, in a case where a leading end portion of a printing medium passes by the sensor, the passage can be detected.

The conveyance part 102 performs a conveyance operation for conveying a printing medium that is fed by the paper feeding part 101. Specifically, the conveyance part 102 conveys the fed printing medium while pinching it with a pinch roller and the conveyance roller 105 driven by a motor, so that the fed printing medium is conveyed in the direction toward the hereinafter-described printing part 103. This operation of the conveyance part 102 is referred to as a conveyance operation.

The printing part 103 prints an image on a printing medium by ink ejection, which is performed by the hereinafter-described printing heads 107 and 108, based on image data for printing. The printing part 103 includes the carriage 106, which can reciprocate in a scanning direction (the X direction in the drawing) perpendicular to the conveyance direction of printing media, and the printing heads 107 and 108, which are mounted on the carriage 106.

The carriage 106 is supported so as to be able to reciprocate in the X direction along a guide rail installed in the printing apparatus 100. The carriage 106 reciprocates in a printing region, which is a region where printing on a printing medium is performed, via the carriage belt 109 driven by a carriage motor, which is the source of motive power. The position and speed of the carriage 106 are detected by an encoder sensor mounted on the carriage 106 and the encoder scale 110 stretched over the printing apparatus, so that the movement of the carriage 106 is controlled based on the detected position and speed. Images are printed on printing media by ejecting ink from at least one of the printing heads 107 and 108 while the carriage 106 is moving. A printing medium on which an image has been printed by the printing part 103 is conveyed while being pinched by a paper discharge roller, which is driven synchronously with the conveyance roller 105 of the conveyance part 102, and a spur, which is pressed against the paper discharge roller, so as to be discharged to the outside of the printing apparatus 100. Here, in a case where the trailing end portion of the printing medium passes by the sensor that detects end portions of printing media, the passage can be detected.

The recovery part 104 includes a wiping mechanism that recovers the state of the ejection port surfaces to a normal state by wiping the ink droplets adhering to the surfaces of the printing heads 107 and 108 where ejection ports are installed, i.e., the ejection port surfaces. The recovery part 104 includes a capping mechanism, which is for covering the ejection ports, and a suction mechanism, which utilizes the capping mechanism for suctioning ink from the inside of the printing heads 107 and 108 through the ejection ports.

Figure 2A:
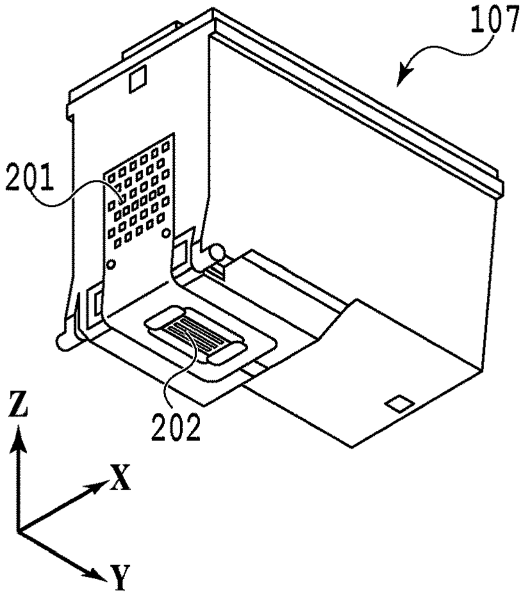
FIG. 2A to FIG. 2C are schematic configuration diagrams illustrating a configuration of a printing head.
Figure 2B:
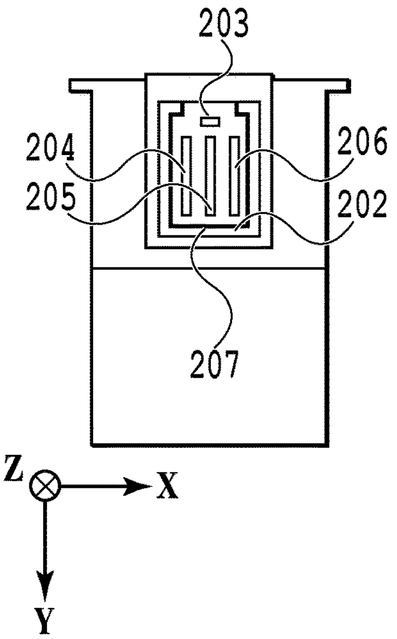
Figure 2C:
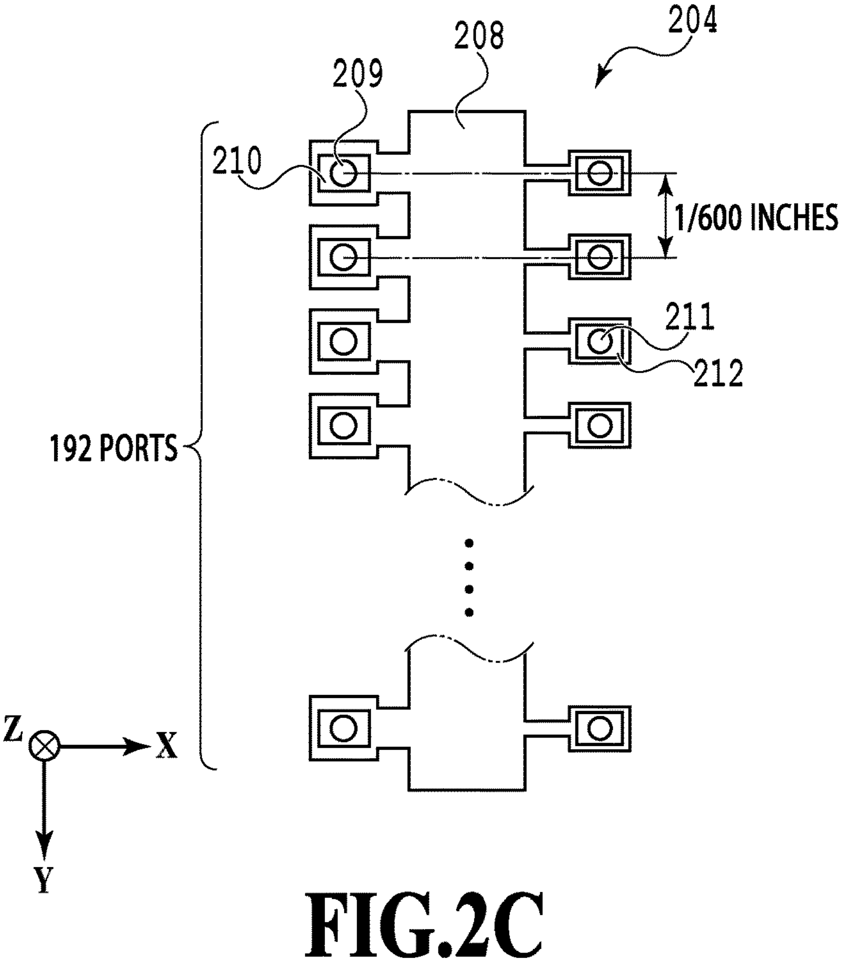

FIG. 2A to FIG. 2C are diagrams illustrating the configuration of the printing head 107 of the present embodiment. FIG. 2A is a perspective view diagram illustrating a part of the printing head 107. FIG. 2B is a bottom view diagram of a part of the printing head 107 viewed in the Z direction. FIG. 2C is an enlarged view diagram illustrating the ejection port array 204 for cyan ink in the printing head 107.

The printing head 107 is an inkjet printing head with a thermal system that ejects ink using heat energy generated by heating elements. The printing head 107 receives printing signals from the main body of the printing apparatus 100 via the contact pad 201. The printing head 107 is supplied with electric power necessary for driving the printing head 107 via the contact pad 201. The diode sensor 203 for detecting the temperature of a printing head substrate, the ejection port array 204 for ejecting cyan ink, the ejection port array 205 for ejecting magenta ink, and the ejection port array 206 for ejecting yellow ink are arranged in the printing chip 202. The sub-heater 207 for heating the inks is installed so as to surround the ejection port arrays 204, 205, and 206. This sub-heater 207 heats the printing head substrate and inks in response to application of a voltage. Therefore, it is possible to control whether or not to heat the printing head substrate and inks by whether or not to apply a voltage to the sub-heater 207.

The ejection port 209 for ejecting 5 pl of ink is arranged on one side of the ink chamber 208, and the ejection port 211 for ejecting 2 pl of ink is arranged on the other side. The 5-pl ink ejection heater 210 corresponding to the ejection port 209 is arranged immediately below the ejection port 209 (on the +Z direction side), and the 2-pl ink ejection heater 212 corresponding to the ejection port 211 is arranged immediately below the ejection port 211. The numbers of ejection ports 209 and 211 are both 192, and the intervals between ejection ports are 1/600 inches. Thus, the printing head 107 of the present embodiment is configured so that the printed pixel density is 600 dpi.

The 5-pl ink ejection heater 210 and the 2-pl ink ejection heater 212 can retain the temperature of the ink by the application of a driving pulse to an extent that the ink is not ejected. This temperature-retention control is referred to as short-pulse heating control. The printing apparatus 100 of the present embodiment adjusts the temperature of the printing head substrate and the ink temperature (hereinafter collectively referred to as the head temperature) by the short-pulse heating control and control of the sub-heater 207. Specifically, based on outputs of the diode sensor 203, feedback control is performed by switching between heating and non-heating of the printing head and inks so as to approach the target temperature. Note that the printing head 108 also has the same configuration as the printing head 107, and the same control as that in the printing head 107 is performed in the printing head 108 as well.

Figure 3:
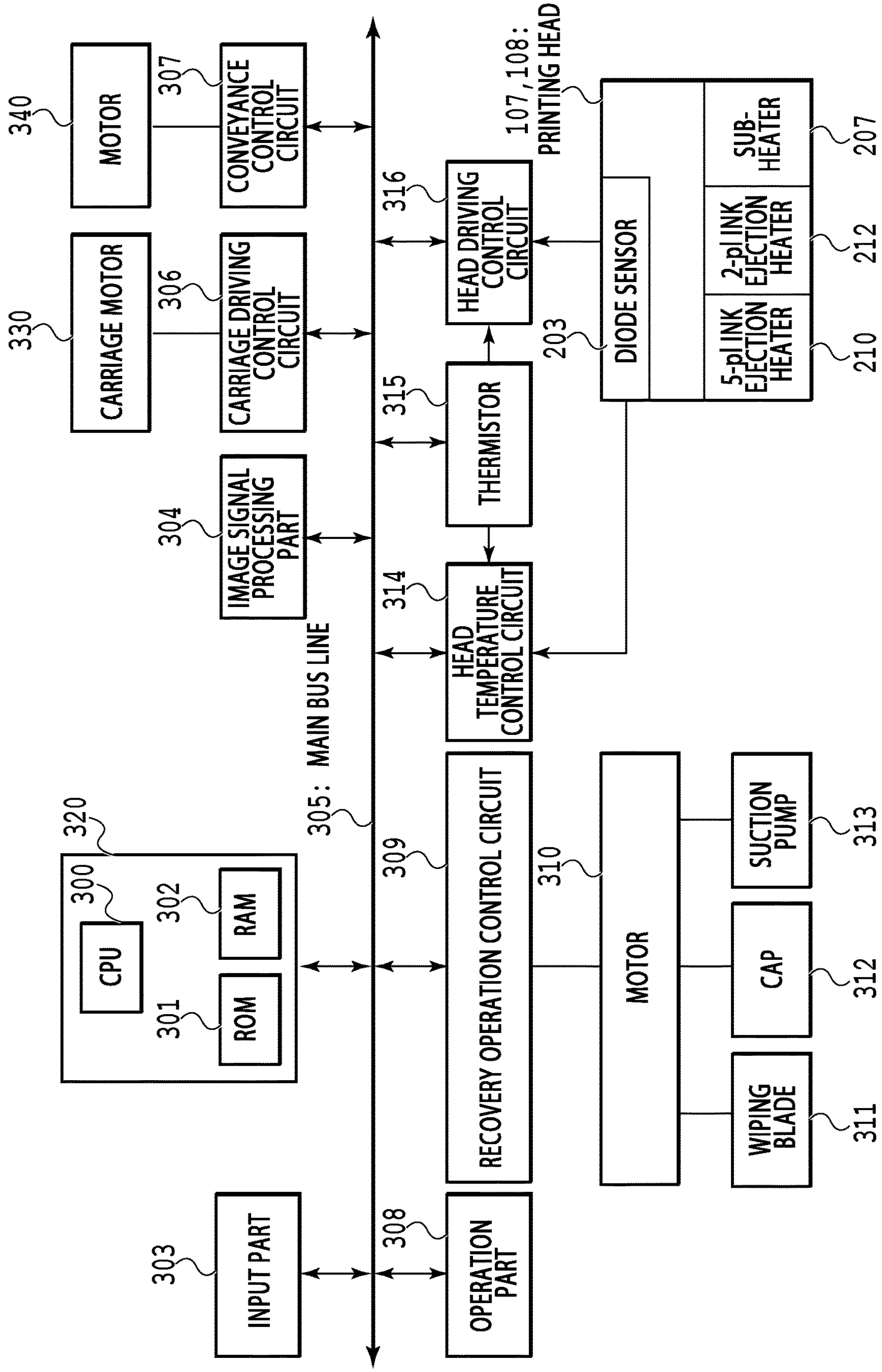
FIG. 3 is a block diagram illustrating an entire control configuration of the printing apparatus.

FIG. 3 is a block diagram illustrating a configuration for controlling the printing apparatus 100 of the present embodiment. Each of the constituent elements illustrated in FIG. 3 can be roughly categorized into control units as software systems and processing units as hardware systems. The control units as software systems include the input part 303, the image signal processing part 304 corresponding thereto, and the processing units of the control part 320, which access the main bus line 305, respectively. The processing units as hardware systems include processing units such as the operation part 308, the recovery operation control circuit 309, the head temperature control circuit 314, the head driving control circuit 316, the carriage driving control circuit 306, and the conveyance control circuit 307.

The control part 320 of the printing apparatus 100 is configured with the CPU 300, the ROM 301, and the RAM 302. The CPU 300 generates image data for printing, based on a job that is input to the input part 303, and drives the 5-pl ink ejection heater 210 and the 2-pl ink ejection heater 212 in the printing heads 107 and 108, based on the generated image data. Accordingly, a printing operation is performed on a printing medium. In the ROM 301, a program for executing the recovery process for the printing heads 107 and 108 according to a predetermined timing chart is stored in advance. By executing this program, for example, recovery conditions such as conditions for performing preliminary ejection are provided to the recovery operation control circuit 309 and the head driving control circuit 316 as necessary. The head driving control circuit 316 drives the printing heads 107 and 108 according to the provided recovery conditions.

The carriage driving control circuit 306 controls the movement of the carriage 106 in the scanning direction, and the conveyance control circuit 307 controls the conveyance of a printing medium in the conveyance direction.

The motor 310 drives the wiping blade 311 which wipes off the ink adhering to the ejection port surfaces of the printing heads 107 and 108 that have been moved to the opposing positions, the cap 312 which caps the ejection port surfaces, and the suction pump 313 which suctions the insides of the printing heads 107 and 108. Note that the motor 310 may be a motor common to the motor 340, which is controlled by the conveyance control circuit 307 to execute the conveyance and paper feeding operations.

The head temperature control circuit 314 determines the driving conditions of the sub-heaters 207 on the printing heads 107 and 108, based on output values of the thermistor 315, which detects the environmental temperature where the printing apparatus is installed, and the diode sensors 203, which detect the head temperatures. The head driving control circuit 316 controls the driving of the sub-heaters 207, based on the determined driving conditions.

The head driving control circuit 316 also controls the driving of the 5-pl ink ejection heaters 210 and the 2-pl ink ejection heaters 212 of the printing heads 107 and 108. By this driving of the heaters, ink ejection such as preliminary ejection by the printing heads 107 and 108 or short-pulse heating control is performed.

A program for the head heating and retaining process, which is described hereinafter, is stored in the ROM 301, for example. By executing the program, the CPU 300 executes the detection of the head temperatures, the head heating and retaining process, etc., via the head temperature control circuit 314, the head driving control circuit 316, and the like. Note that the head driving control circuit 316 can also perform PWM driving control by driving the 5-pl ink ejection heaters 210 and the 2-pl ink ejection heaters 212 with drive signals configured with pre-pulses and main pulses.

The motor configuration of the printing apparatus 100 may be a configuration including two motors, i.e., the motor 340 (310) and the carriage motor 330, for executing multiple operations such as the paper feeding operation, the conveyance operation, and the recovery operation. Alternatively, there may be a configuration including three motors, i.e., a pickup motor for the paper feeding operation and the recovery operation, a conveyance motor for the conveyance operation, and a carriage motor. In a configuration where multiple operations such as the paper feeding operation and the conveyance operation are executed with one motor, a lever is installed for changing the connection state of gears with each roller, in order to switch the rollers that receive the motive power of the motor. By switching the lever, multiple operations are implemented with one motor. The switching of the lever is performed by moving the carriage 106. Although the following explanation is given on the premise that the printing apparatus 100 is a printing apparatus with a configuration in which the paper feeding operation and the conveyance operation are executed with the one motor 340 in principle, it is also possible to apply the technique of the present disclosure to printing apparatuses with such a configuration including three motors as described above.

[Regarding Temperature Obtainment Control]

Figure 4:
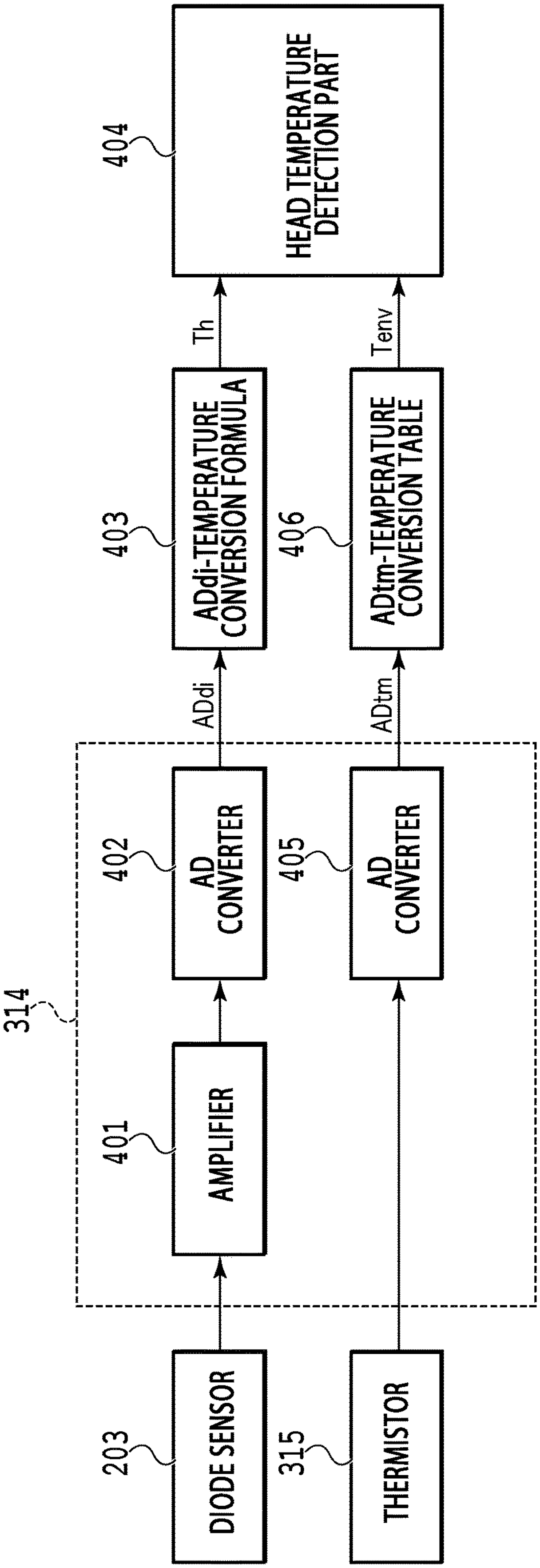
FIG. 4 is a block diagram illustrating a flow of processing in a head temperature control circuit.

FIG. 4 is a block diagram illustrating the processing of the head temperature control circuit 314 and a flow of the processing performed on software through the ROM 301 and the RAM 302. If a voltage based on a head temperature is input to the head temperature control circuit 314 from the diode sensors 203 installed in the printing heads 107 and 108, the voltage value is amplified by the amplifier 401. The AD converter 402 digitizes the amplified voltage value. The digitized value is referred to as the diode sensor voltage value ADdi. The diode sensor voltage value ADdi is converted into a temperature detected by a diode (which is referred to as the head temperature Th) by use of the ADdi-temperature conversion formula 403, which is stored in advance in the ROM 301 for converting the diode sensor voltage value ADdi into a temperature.

On the other hand, if a voltage based on the environmental temperature of the printing apparatus is input from the thermistor 315 to the head temperature control circuit 314, the AD converter 405 digitizes the input value. The digitized value is referred to as the thermistor voltage value ADtm. The thermistor voltage value ADtm is converted into a temperature detected by the thermistor (which is referred to as the thermistor temperature Tenv) by use of the ADtm-temperature conversion table 406, which is stored in advance in the ROM 301 for converting the thermistor voltage value ADtm into a temperature.

[Regarding the Printing Process Involving the Heating and Retaining Process of the Printing Heads]

In the printing process, the head heating and retaining heat process (hereinafter simply referred to as the heating and retaining process, or heating process), in which the head temperature is heated to a target temperature prior to a printing operation on a printing medium, is performed for the purpose of making the ink viscosity suitable for ejection, etc.

In order to suppress a decrease in throughput, it is preferable that the heating and retaining process is executed in parallel with the paper feeding operation, the conveyance operation, etc., of the printing medium. On the other hand, if power consumption increases due to such parallel processing, there is a possibility of exceeding the allowable power of the printing apparatus 100. For example, the paper feeding operation and the conveyance operation of a printing medium as well as the movement of the carriage 106 are all operated by the driving of the motors, which increases the power consumption. Therefore, in the present embodiment, an explanation is given of the method of performing the heating and retaining process multiple times during a period in which the movement of the carriage 106 as well as the paper feeding operation or the conveyance operation are not performed in parallel.

Figure 5:
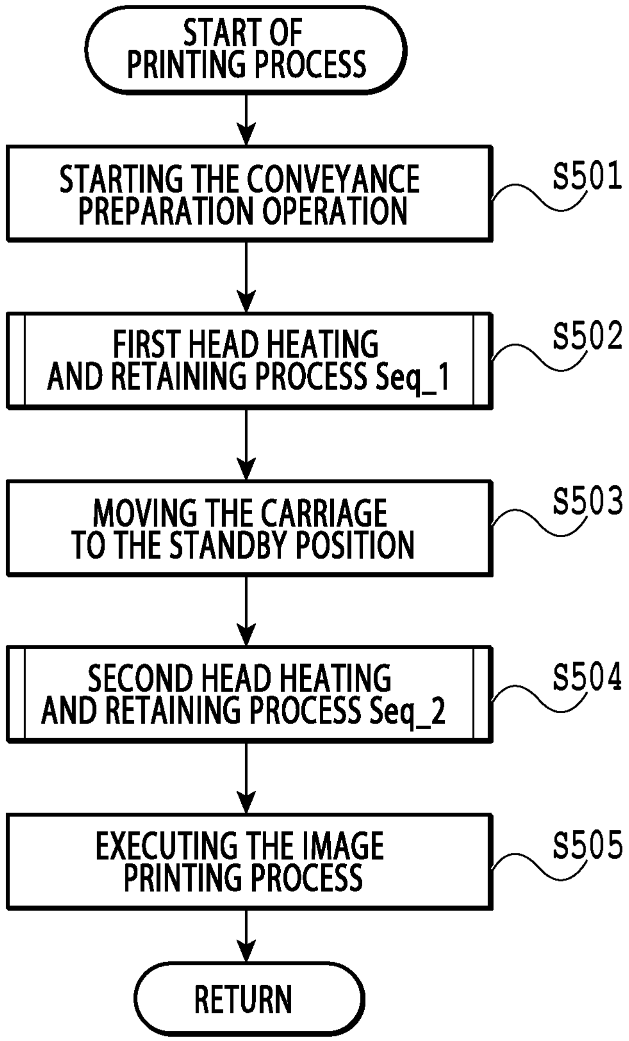
FIG. 5 is a flowchart illustrating the execution timings of heating and retaining processes.

FIG. 5 is a flowchart of processing for printing an image on printing paper, based on a print job, which is executed by the printing apparatus 100. The explanation of the flowchart is given on the premise that the series of processes illustrated in the flowchart of FIG. 5 is performed by the CPU 300 loading a program code stored in the ROM 301 into the RAM 302 and executing it. Furthermore, the functions for performing a part or all of the steps of FIG. 5 may be implemented by hardware such as an ASIC or an electronic circuit. Note that the symbol "S" in the explanation of each process indicates that it is a step in the flowchart, and the same applies to the following flowcharts. The processing of the flowchart in FIG. 5 starts in a case where the printing apparatus 100 receives a print job, which is an image processing printing command.

S501 to S505 are processes related to printing on one printing medium that is a printing target. In a case with a print job for printing images on multiple sheets of printing media, the processes of S501 to S505 are repeated for the multiple sheets of printing media.

In S501, the CPU 300 starts the paper feeding operation of the printing medium which is the printing target. In the following steps S502 and S503, the paper feeding operation of the printing medium and a preparation operation for printing an image on the fed printing medium are performed in parallel. The preparation operation is a part of the conveyance operation and is an operation in which the leading edge of the printing medium is detected and the registration of the printing medium is performed by use of the conveyance roller so that the head of the image to be firstly printed on the printing medium is located at the scanning positions of the printing heads 107 and 108. The operation from the paper feeding operation to the preparation operation is referred to as the conveyance preparation operation.

In S502, the heating and retaining process for adjusting the head temperature is performed by heating the printing heads 107 and 108 and the inks so that the head temperature Th becomes the target temperature. In the present embodiment, the heating and retaining process is performed multiple times in a period from the start of the paper feeding operation of the printing medium, which is the printing target, to the start of printing the image on the printing medium. The flowchart of FIG. 5 is a flowchart in the case of performing the heating and retaining process twice.

The N-th heating and retaining process among the multiple times of heating and retaining processes is denoted as the heating and retaining process Seq_N. That is, in S502, the heating and retaining process Seq_1, which is the first heating and retaining process, is performed to heat the printing heads 107 and 108 and the inks so that the head temperature Th becomes the target temperature T_1. Details of the heating and retaining process are described hereinafter. If the first heating and retaining process Seq_1 ends, the processing proceeds to S503.

After the start of S501, the carriage 106 is moved in order to switch the above-described lever for driving the pickup roller and the paper feeding roller with the motor. The motor is accelerated so that the printing medium, which is the printing target, is picked up by the pickup roller. Since the power consumption of the motor increases particularly at the time of the acceleration of the motor, if the motor is accelerated and the printing heads 107 and 108 are heated at the same time, the power consumption may exceed the power supply capacity of the power source. Therefore, after the start of S501, the first heating and retaining process Seq_1 of S502 may be started after the acceleration of the motor is finished. Alternatively, if the power load of the motor is small and the parallel operation with the heating and retaining process is possible, S502 may be started at the same time as S501.

In S503, the CPU 300 moves the carriage 106 to the standby position via the carriage driving control circuit 306. In S503, the process of S503 is executed after the end of the first heating and retaining process Seq_1 of S502, so that the movement of the carriage 106 with a large power load is not executed in parallel with the heating and retaining process.

In the configuration where the multiple operations such as the paper feeding operation and the conveyance operation are implemented with one motor, the lever capable of changing the connection state of gears between the motor and the rollers is switched by the carriage 106 before the conveyance preparation operation. In this case, in S503, the carriage 106 is moved from a predetermined position for switching the lever to the standby position, which is at the cap. In such a configuration including multiple motors, where switching of the connection state is not needed, if the carriage 106 is at the printing termination point of the previous image, the carriage 106 is moved to the standby position in S503.

If the carriage has moved to the standby position, the process of S503 is completed and the processing proceeds to S504. As described above, S502 to S503 are performed in parallel with the conveyance preparation operation, and the conveyance preparation operation is completed by the completion of the process of S503.

In S504, the second heating and retaining process Seq_2 is executed to heat the printing heads 107 and 108 and the inks so that the head temperature Th becomes the target temperature T_2. In a case where the head temperature Th has already reached the target temperature T_2, the heating of the printing heads 107 and 108 and the inks is not performed. Details of S504 are described hereinafter. If the second heating and retaining process Seq_2 ends, the processing proceeds to S505.

In S505, the CPU 300 executes the image printing process via the head driving control circuit 316 for causing the printing heads 107 and 108 to eject ink so that the image is printed on the printing medium which is the printing target. S505 is executed after the second heating and retaining process Seq_2 of S504 is completed. Prior to the printing of the image on the printing medium, ink that does not contribute to the image printing may be ejected in order to recover the ejection performance of the printing heads 107 and 108. This ink ejection is referred to as preliminary ejection.

In the image printing process, the sub-heaters 207 heat the printing heads 107 and 108. The head temperature in the image printing process is checked for each printing scan so that the feedback control for switching the heating strength of the sub-heaters 207 is performed, and thus the head temperature in the image printing process is retained.

Figure 6:
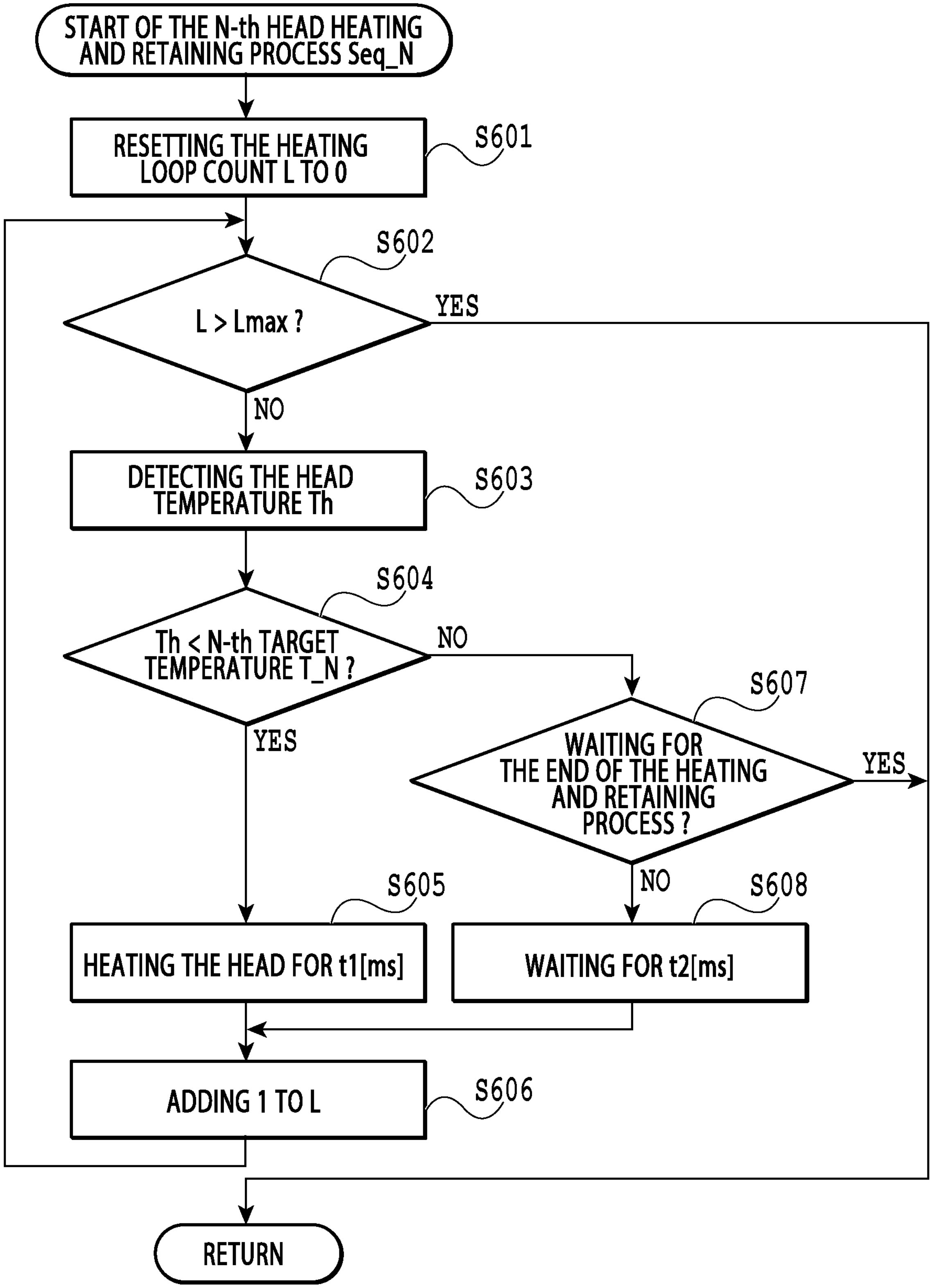
FIG. 6 is a flowchart illustrating the contents of the heating and retaining processes.

FIG. 6 is a flowchart for explaining details of the heating and retaining processes executed in S502 and S504. The flowchart of FIG. 6 is a flowchart for explaining the N-th heating and retaining process Seq_N. The details of the processes of S502 and S504 are explained with reference to FIG. 6. For example, in the first heating and retaining process Seq_1 of S502, the processing in the case where N is set to 1 in each step of the following flowchart is performed. In the second heating and retaining process Seq_2 of S504, the processing in the case where N is set to 2 in each step of the following flowchart is performed.

In S601, the CPU 300 initializes the heating loop count L to 0 (zero) and proceeds to S602. The heating loop count L is a parameter that has a role of managing the heating time period of the printing heads 107 and 108, which specifically is a parameter for counting the accumulated number of times the heating of the printing head 107 or 108 and waiting have been performed. The heating loop count L is used to prevent excessive heat accumulation in the printing head 107 or 108 at the start of image printing process.

In S602, CPU 300 determines whether the heating loop count L is greater than the predetermined number of times Lmax. Note that the number of times derived based on a heating continuation time period, which is obtained in an experiment in advance so that the printing head 107 or 108 does not accumulate excessive heat at the point in time where printing starts, as well as t1 used in S605 and t2 used in S608, which are described hereinafter, may be set as the predetermined number of times Lmax.

In a case where it is determined that the heating loop count L is equal to or less than Lmax (NO in S602), the processing proceeds to S603. In S603, the CPU 300 obtains the head temperature Th detected by the head temperature detection part 404 using the diode sensor 203.

In S604, the CPU 300 determines whether the most recent head temperature Th obtained in S603 is lower than the preset target temperature T_N. The target temperature T_N is, in principle, a different value for each N-th heating and retaining process Seq_N. That is, the target temperature T_1 for the first heating and retaining process Seq_1 and the target temperature T_2 for the second heating and retaining process Seq_2 are set to be different. Details are described hereinafter.

In a case where the head temperature Th is lower than the target temperature T_N (YES in S604), it is indicated that the head temperature Th has not reached the target temperature T_N. In this case, the processing proceeds to S605. In S605, the CPU 300 performs control via the head driving control circuit 316 to heat the printing head 107 or 108 for t1 (ms). The heating process in S605 is performed with the short-pulse heating control by use of the 5-pl ink ejection heaters 210 or the 2-pl ink ejection heaters 212.

On the other hand, in a case where the head temperature Th is equal to or higher than the target temperature T_N (NO in S604), the processing proceeds to S607. In S607, the CPU 300 determines whether the heating and retaining process can be ended.

In S607 corresponding to the first heating and retaining process Seq_1 of S502, in a case where the carriage 106 is ready to move to the standby position, the CPU 300 determines that the heating and retaining process can be ended. For example, in the configuration where multiple operations are implemented with one motor, the lever capable of changing the connection state of gears between the motor and the rollers is switched by the carriage 106. In this configuration, there are restrictions on the timing at which the carriage 106 can be moved, and thus whether the carriage 106 is ready to move to the standby position is determined.

In S607 corresponding to the second heating and retaining process Seq_2 of S504, in a case where the conveyance preparation operation has been completed, it is determined that the heating and retaining process can be ended. Note that, in the present embodiment, the second heating and retaining process Seq_2 of S504 is performed after the conveyance preparation operation is completed. Therefore, in the case of the second heating and retaining process Seq_2 of the present embodiment, the result of the determination in S607 is YES in principle.

In a case where it is determined that the heating and retaining process can be ended (YES in S607), it is guaranteed that the head temperature Th has reached the target temperature T_N, and thus the heating may be ended. Therefore, the N-th heating and retaining process Seq_N ends.

On the other hand, in a case where it is not determined that the heating and retaining process can be ended (NO in S607), the CPU 300 waits for t2 (ms) in S608, so as to wait until the heating and retaining process can be ended.

After S605 or S608 ends, the heating loop count L is incremented by 1 in S606, and the processing returns to S602. By returning to S602 even after S608 ends, the head temperature Th is retained near the target temperature T_N.

On the other hand, in a case where it is determined that the heating loop count L exceeds Lmax (YES in S602), the N-th heating and retaining process Seq_N ends. To finish the N-th heating and retaining process Seq_N due to the heating loop count L exceeding Lmax in this way is referred to as a cancellation. The cancellation is executed to prevent the printing head 107 or 108 from excessively accumulating heat due to continued heating of the printing head 107 or 108.

[Regarding Changes in Head Temperature in Heating and Retaining Processes]

Figure 7A:
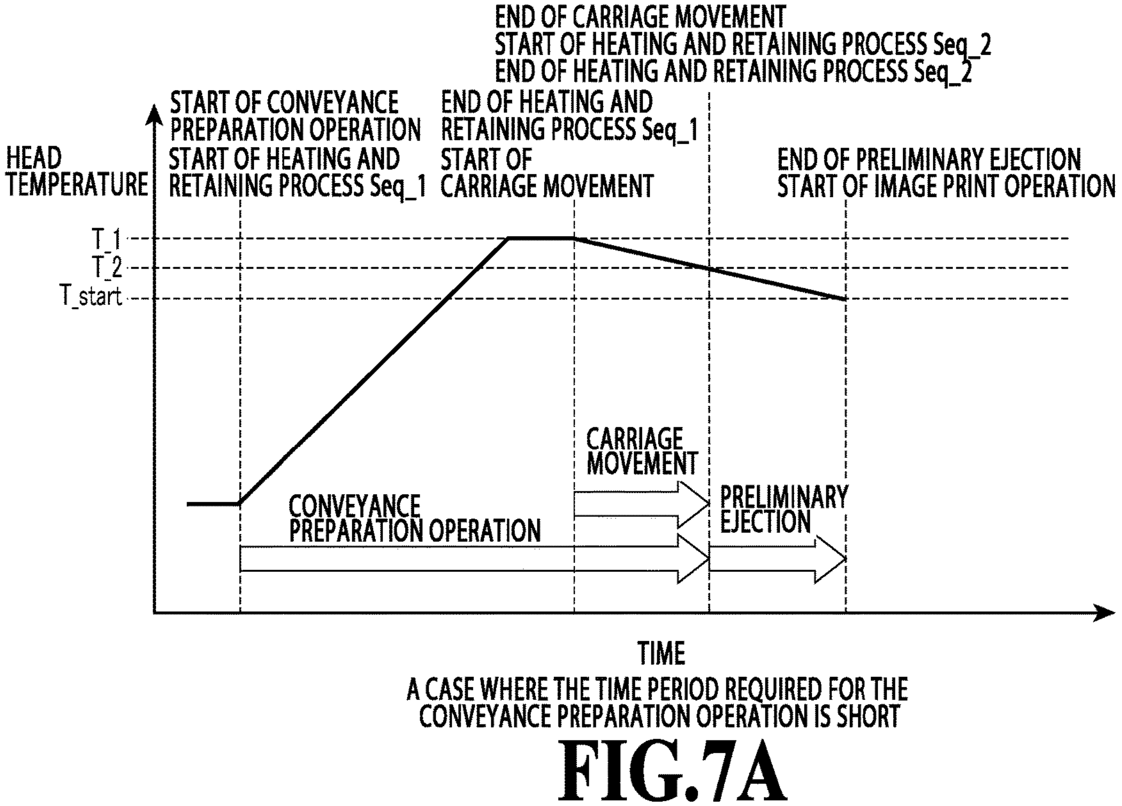
FIG. 7A and FIG. 7B are diagrams of an image of the change in head temperature.
Figure 7B:
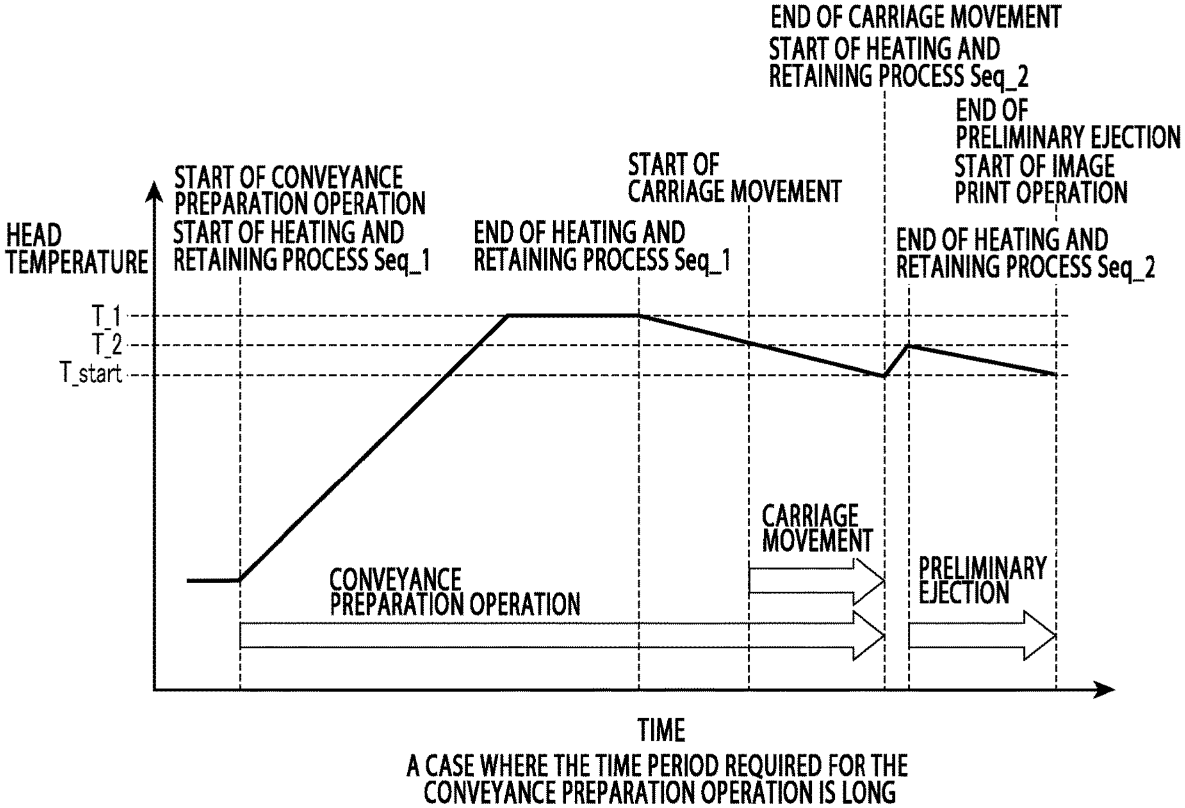

FIG. 7A and FIG. 7B are diagrams for explaining changes in the head temperature Th from the start of a conveyance preparation operation to the start of an image print operation. In FIG. 7A and FIG. 7B, changes in the head temperature Th before printing an image on the first printing medium are illustrated. FIG. 7A is a diagram for explaining the change in the head temperature Th in a case where the time period required for the conveyance preparation operation is short. The case where the time period required for the conveyance preparation operation is short is, for example, a case where a silent mode or a low power consumption mode is not selected or a case where no trouble or the like occurs.

The target temperature T_N described above is set in consideration of the temperature T_start of the head temperature Th, which is desired to be achieved at the time of executing an image print operation, and the amount of temperature drop in the head temperature Th that occurs between an end of the heating and retaining process and a start of an image print operation. That is, the target temperature T_N is set to a temperature equal to the temperature T_start or higher than the temperature T_start.

In the case where the time period required for the conveyance preparation operation is short, the target temperature T_1 of the first heating and retaining process Seq_1 is set so that the head temperature Th at the start of the image print operation is the temperature T_start even if the second heating and retaining process Seq_2 is not executed.

FIG. 7B is a diagram for explaining the change in head temperature in a case where the time period required for the conveyance preparation operation is long. In a case where a silent mode or a low power consumption mode is selected or in a case where the time required for the conveyance preparation operation becomes long for some reason, the heating loop count L exceeds Lmax. Therefore, in order to prevent excessive heat accumulation, the first heating and retaining process Seq_1 is cancelled even while the conveyance preparation operation is being executed. In this case, the time period in which the head temperature Th drops becomes longer, compared to a case with no cancellation, and thus the head temperature Th drops below the temperature T_start at the start of the image print operation. In the present embodiment, the second heating and retaining process Seq_2 is executed in S504, and thus, even in a case where the time period required for the conveyance preparation operation becomes long, the head temperature at the start of the image print operation is guaranteed to be the temperature T_start.

The timing of executing the second heating and retaining process Seq_2 is closer to the start of the image print operation than to the first heating and retaining process Seq_1. Therefore, in the second heating and retaining process Seq_2, it can be said that the amount of temperature drop in the head temperature Th to be considered is smaller than that in the first heating and retaining process Seq_1. Therefore, the target temperature T_2 in the second heating and retaining process Seq_2 and the target temperature T_1 in the first heating and retaining process Seq_1 are set so as to satisfy the following Formula (1).

$$T\_1>T\_2\geq T\_\text{start} \qquad \text{Formula (1)}$$

If the time period from the end of the second heating and retaining process Seq_2 to the start of the image print operation is short, the target temperature T_2 may be set so as to be T_2=T_start. As illustrated in FIG. 7A and FIG. 7B, after the end of the second heating and retaining process Seq_2, a refreshing process such as preliminary ejection may be performed before the image print operation is started. In this case, it is necessary to set the target temperature T_2 so as to be T_2>T_start in consideration of the temperature drop in the head temperature Th that occurs during the refreshing process.

At the time of executing the second heating and retaining process Seq_2, the conveyance preparation operation has been completed. The image print operation is to be performed after the second heating and retaining process Seq_2 is completed. In this way, although the second heating and retaining process Seq_2 is not executed in parallel with other processes, the target temperature is set so as to suppress a decrease in throughput due to the second heating and retaining process Seq_2 of the present embodiment.

Specifically, in a case where the time period required for the conveyance preparation operation is short, the target temperature T_1 of the present embodiment is set to be higher than the target temperature T_2 so that the head temperature Th at the start of the second heating and retaining process Seq_2 exceeds the target temperature T_2. In a case where the head temperature Th exceeds the target temperature T_2 in practice at the start of the second heating and retaining process Seq_2, the second heating and retaining process Seq_2 ends immediately since the printing head 107 or 108 is not to be heated in S605.

In the present embodiment, the target temperature T_2 is set to an appropriate value smaller than the target temperature T_1. Therefore, even in a case where the time period required for the conveyance preparation operation is long, an increase in time period required for the heating process of the second heating and retaining process Seq_2 is suppressed.

The target temperature T_1 is a temperature in consideration of a temperature drop in the head temperature Th during the operation of moving the carriage 106. Therefore, if the target temperature T_1 and the target temperature T_2 are set to the same value, excessive heating may be performed in the second heating and retaining process Seq_2, which is executed after the carriage 106 is moved to the standby position and at a timing close to the start of the image print operation. Therefore, in the present embodiment, by setting the target temperature T_2 lower than the target temperature T_1, it is possible to suppress adverse effects on images due to the inks and the printing head 107 or 108 being heated to an unnecessarily high temperature.

Note that, in the above-described explanation, the case where the heating loop count L exceeds Lmax in the first heating and retaining process Seq_1 and the heating and retaining process Seq_1 is cancelled is assumed as the case where heating is performed in S605 of the second heating and retaining process Seq_2. That is, in a case where it is determined in S604 of the second heating and retaining process Seq_2 that the head temperature Th is lower than the target temperature T_2, it is considered that the first heating and retaining process Seq_1 has been cancelled.

Therefore, a step of a determination process for determining whether or not the first heating and retaining process Seq_1 has been cancelled may be added before the second heating and retaining process Seq_2 is started in S504. In a case where it is not determined in the added step that the first heating and retaining process Seq_1 has been cancelled, the processing may proceed to S505, skipping the second heating and retaining process Seq_2 of S504. Specifically, a flag for managing the end state of a heating and retaining process is provided. In a case where the first heating and retaining process Seq_1 of S502 is cancelled, the flag is set to ON. Before the second heating and retaining process Seq_2 of S504 is started, whether or not the flag is ON is determined, so that the processing proceeds to S504 only in a case where the flag is ON, and, in a case where the flag is OFF, the second heating and retaining process Seq_2 of S504 is skipped. In this way, a condition for executing the second heating and retaining process Seq_2 of S504 may be provided.

Note that the start timing of S502 in FIG. 5 may be changed depending on whether the printing medium is the first sheet or the second or a subsequent sheet. The values of the target temperatures T_1 and T_2 may be switched depending on whether the printing medium is the first sheet or the second or a subsequent sheet.

Second Embodiment

In the present embodiment, a method for setting the target temperature T_1 and the target temperature T_2 different from that of the first embodiment is explained. In the present embodiment, the differences from the first embodiment are mainly explained. The parts that are not particularly described have the same configurations or processes as those of the first embodiment.

Figure 8A:
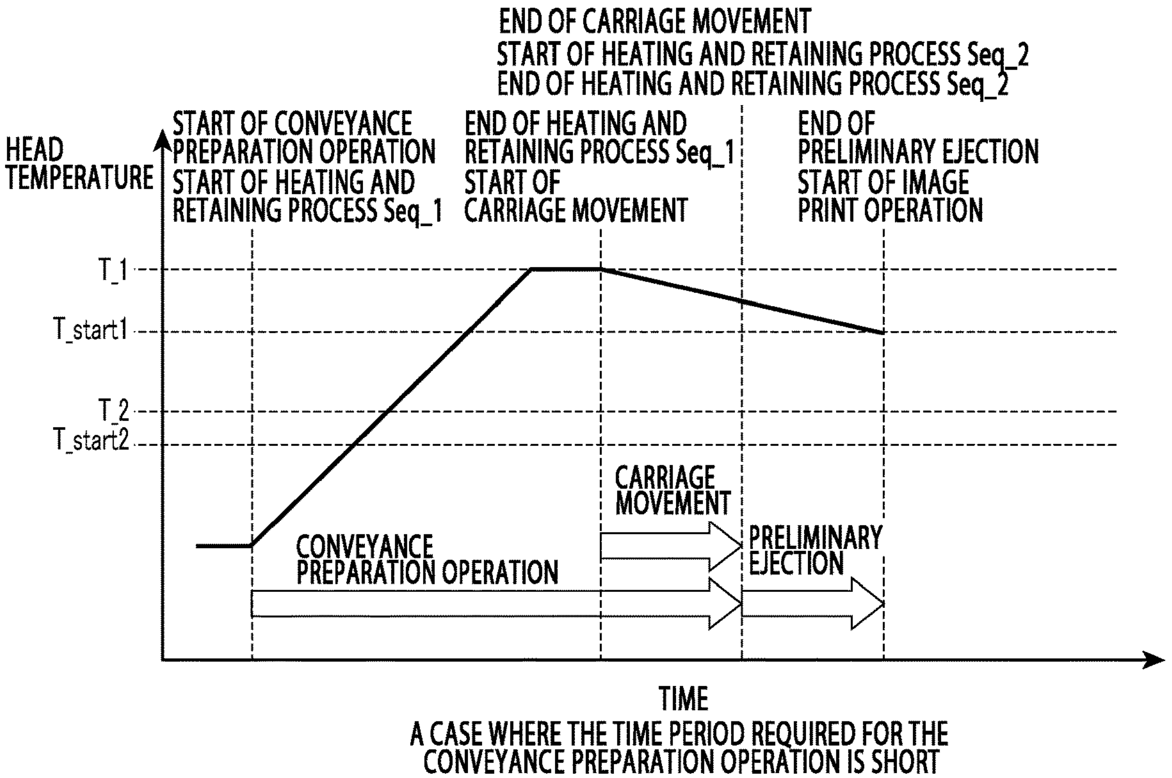
FIG. 8A and FIG. 8B are diagrams of an image of the change in head temperature.
Figure 8B:
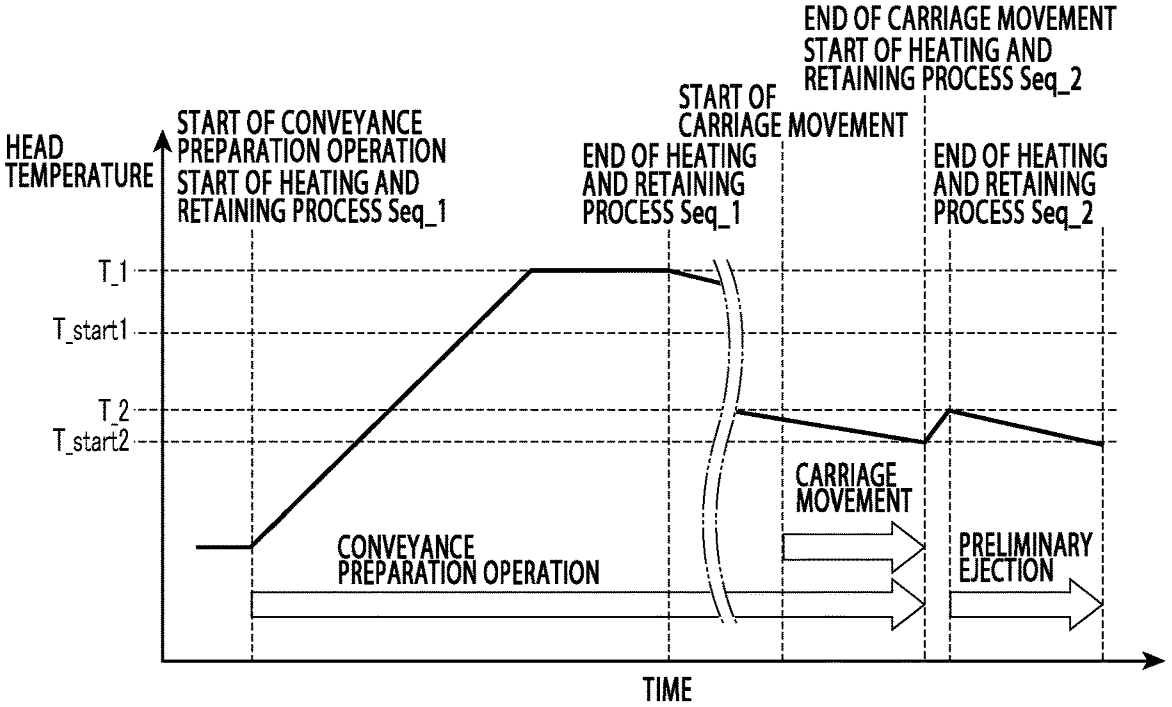

FIG. 8A and FIG. 8B are diagrams for explaining changes in the head temperature Th from the start of a conveyance preparation operation to the start of an image print operation. FIG. 8A is a diagram for a case where the time period required for the conveyance preparation operation is short, and FIG. 8B is a diagram for a case where the time period required for the conveyance preparation operation is long.

For example, there is a lower limit value for the head temperature Th that is desired to be achieved at the time of executing the image print operation, and that temperature is denoted as the temperature T_start2. The more preferable head temperature Th is denoted as T_start1. For example, the temperature T_start1 is the same temperature as temperature T_start of the first embodiment.

In the present embodiment, the target temperature T_2 is set based on the temperature T_start2, which is a temperature lower than the temperature T_start1 corresponding to the temperature T_start of the first embodiment. Therefore, the target temperature T_2 of the present embodiment is set as a temperature lower than the target temperature T_2 of the first embodiment.

If the time period from the end of the second heating and retaining process Seq_2 to the start of the image print operation is short, the target temperature T_2 may be set so as to be T_2=T_start2. After the second heating and retaining process Seq_2 ends, a refreshing process such as preliminary ejection may be performed before the image print operation is started. In this case, the target temperature T_2 is set so as to be T_2>T_start2 in consideration of the temperature drop in the head temperature Th that occurs during the refreshing process.

On the other hand, the target temperature T_1 is set based on the temperature T_start1, which is higher than the temperature T_start2. In this way, the temperature for setting the target temperature T_1 and the temperature for setting the target temperature T_2 may be different.

Note that the target temperature T_2 may be set by the method of the present embodiment only in a case where a predetermined condition is satisfied and may be set by the method of the first embodiment in the other cases. For example, in a case where the first heating and retaining process is cancelled, the method of the present embodiment is used so as to set the target temperature T_2 low. Another possible configuration is that, in a case where the first heating and retaining process is not cancelled, the target temperature T_2 is switched so that the target temperature T_2 is set by the method of the first embodiment.

As explained above, according to the present embodiment, in a case where the conveyance preparation operation takes a long time period due to an irregular operation such as a defective operation, the heating is regulated to be enough for guaranteeing the lowest head temperature Th feasible for the image print operation. Therefore, the time period required for executing the second heating and retaining process is reduced, and thus the user's waiting time period can be reduced.

Third Embodiment

Although an explanation has been given of the printing apparatus in which the heating and retaining process is performed twice in the first embodiment, the number of times the heating and retaining process is performed need not be limited to twice. In the present embodiment, an explanation is given of a printing apparatus in which the number of times the heating and retaining is performed is three times, which is more than twice. In the present embodiment, the differences from the first embodiment are mainly explained. The parts that are not particularly described have the same configurations or processes as those of the first embodiment.

Figure 9:
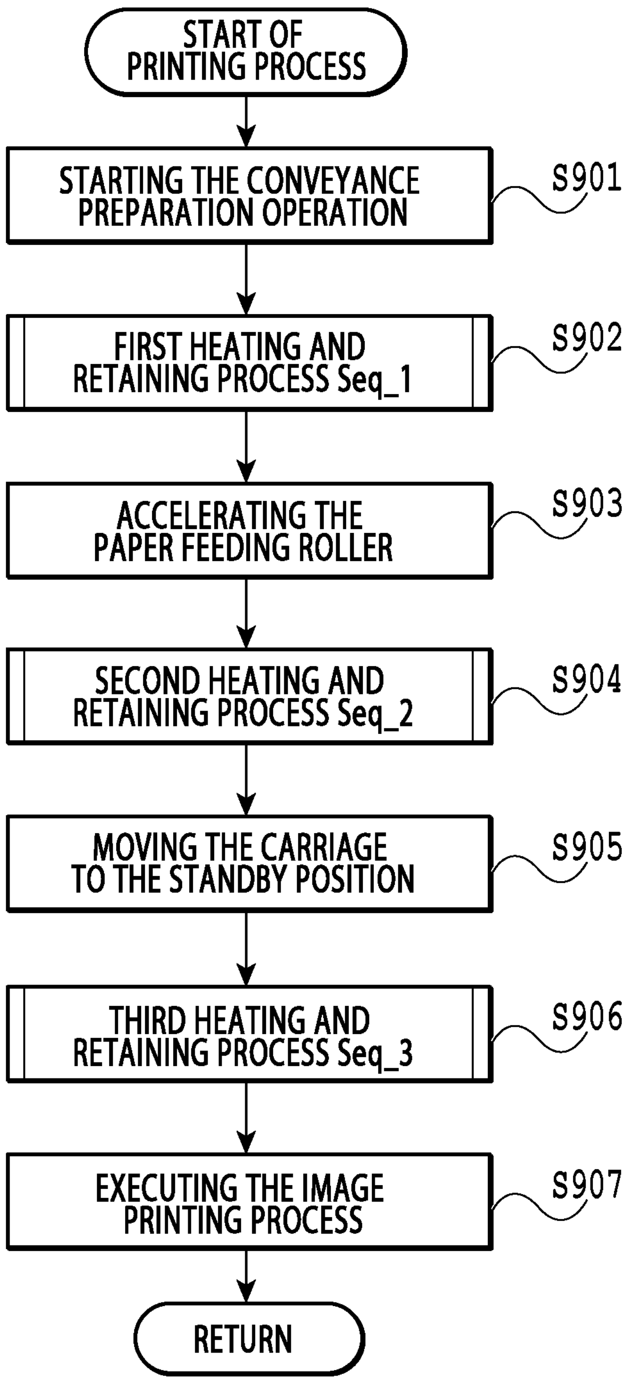
FIG. 9 is a flowchart illustrating the execution timings of the heating and retaining processes.

FIG. 9 is a flowchart of processing for printing an image on printing paper, based on a print job, which is executed by the printing apparatus 100 of the present embodiment.

In the following explanation, it is assumed that the printing apparatus 100 is a printing apparatus configured to execute the paper feeding operation and the conveyance operation with one motor.

In S901, the CPU 300 starts the paper feeding operation of the printing medium which is the printing target. By the time of the start of the next step S902, the processing up to the process of moving the carriage 106 is performed in order to switch the lever for driving the pickup roller and the paper feeding roller with the motor.

In S902, the first heating and retaining process Seq_1 is executed. After the first heating and retaining process Seq_1 ends, the next step S903 is executed.

In S903, the CPU 300 accelerates the motor, so as to accelerate the pickup roller and the paper feeding roller to pick up the printing medium which is the printing target. After the acceleration of the paper feeding roller ends, the processing proceeds to S904. The next step S904 is performed in parallel with the rest of the conveyance preparation operation. The determination as to whether the acceleration of the paper feeding roller has ended is made based on the number of rotations of the rollers and the elapsed time, for example.

In S904, the second heating and retaining process Seq_2 is executed. In the present embodiment, the second heating and retaining process Seq_2 is the last heating and retaining process among the heating and retaining processes performed before the end of the conveyance preparation operation. If the second heating and retaining process Seq_2 ends, the processing proceeds to S905.

In S905, the CPU 300 moves the carriage 106 to the standby position via the carriage driving control circuit 306. After the carriage 106 has moved to the standby position, the processing proceeds to S906.

In S906, the third heating and retaining process Seq_3 is executed. If the third heating and retaining process Seq_3 ends, the processing proceeds to S907.

In S907, the CPU 300 executes the image printing process via the head driving control circuit 316 for causing the printing head 107 or 108 to eject ink so that the image is printed on the printing medium which is the printing target.

Note that the number of times the heating and retaining process is performed may be three times or more, and the orders of the respective steps may be switched.

Figure 10:
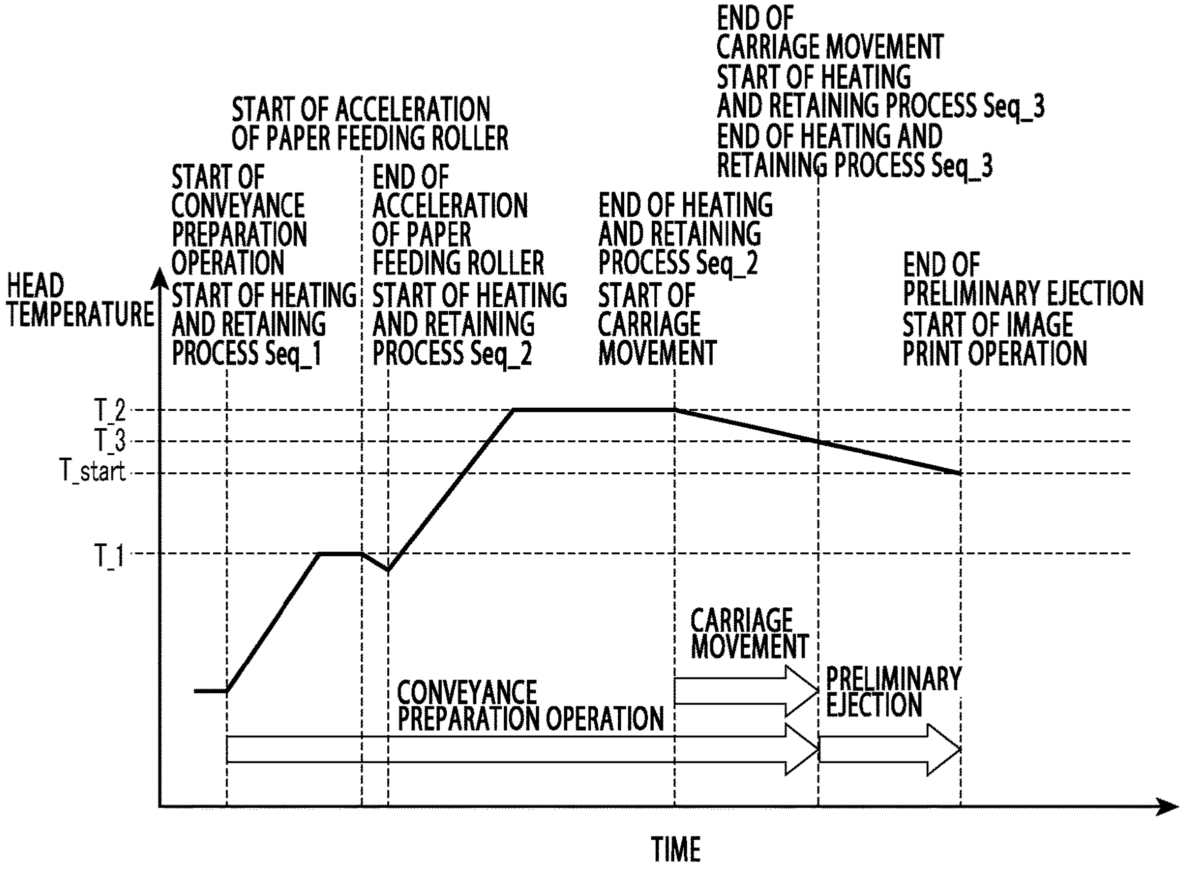
FIG. 10 is a diagram of an image of the change in head temperature.

FIG. 10 is a diagram for explaining the change in the head temperature Th from the start of a conveyance preparation operation to the start of the execution of an image print operation. FIG. 10 is a diagram illustrating a case where the time period required for the conveyance preparation operation is long.

In the first heating and retaining process Seq_1 that starts after the start of the conveyance preparation operation, the target temperature T_1 is set in order to prevent the printing head 107 or 108 from excessively accumulating heat due to continued heating and retaining at a high temperature. Specifically, the temperature is set to a temperature lower than the target temperature T_2 and the target temperature T_3.

In the second heating and retaining process Seq_2, which starts after the acceleration of the paper feeding roller ends, the target temperature T_2 is set in consideration of the temperature drop in the head temperature Th that occurs in a period from the end of the second heating and retaining process Seq_2 to the start of the image print operation. Specifically, the target temperature T_2 is set in consideration of the temperature drop in the head temperature Th so that the head temperature Th at the start of the image print operation becomes the preferable temperature T_start at the start of the image print operation. For example, the same temperature as the target temperature T_1 in the first embodiment and the second embodiment described above is set as the target temperature T_2 in the present embodiment.

The third heating and retaining process Seq_3 of the present embodiment is a heating and retaining process corresponding to the second heating and retaining process Seq_2 of the first embodiment and the second embodiment described above. That is, even in a case where the time period required for the conveyance preparation operation is long and the heating and retaining process executed before the movement of the carriage is cancelled, the third heating and retaining process Seq_3 of the present embodiment is executed so that the head temperature Th becomes the temperature T_start.

The target temperature T_3 is set in consideration of the amount of temperature drop in the head temperature Th that occurs in a period from the end of the third heating and retaining process Seq_3 to the start of the image print operation. Specifically, the target temperature T_3 of the present embodiment may be set in the same manner as the method for setting the target temperature T_2 in the first embodiment and the second embodiment described above. Therefore, the target temperature T_2 and the target temperature T_3 are set so as to satisfy the following Formula (2).

$$T\_2 > T\_3 \geq T\_start \quad \text{Formula (2)}$$

In a case where the time period required for the conveyance preparation operation is short, if the target temperature T_2 and the target temperature T_3 are appropriately set, the head temperature Th reaches the target temperature T_3 at the point in time where the third heating and retaining process Seq_3 starts. Therefore, in a case where the time period required for the conveyance preparation operation is short, the image print operation can be quickly executed.

Although there is not a limitation on the target temperature T_1, it is desirable that the target temperature T_1 is a relatively low temperature as described above. By setting the target temperatures in this way, the time period required for the heating and retaining processes and a decrease in throughput can be suppressed. And it is possible to suppress adverse effects on images caused by heating to an unnecessarily high temperature.

According to the present disclosure, it is possible to bring the printing heads to an appropriate temperature before image printing while suppressing a decrease in throughput and excessive heat accumulation in the printing heads.

Other Embodiments

Embodiment(s) of the present disclosure can also be realized by a computer of a system or apparatus that reads out and executes computer executable instructions (e.g., one or more programs) printed on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-140632, filed Sep. 5, 2022, which is hereby incorporated by reference herein in its entirety.

What is claimed is:

1. A printing apparatus comprising:

a printing head configured to print an image by ejecting ink to a printing medium that has been conveyed;

a heating unit configured to heat the printing head; and a control unit configured to control performance of a selected one of (1) a first heating process and (2) the first heating process and a second heating process, each of the first heating process and the second heating process being a process, performed before the printing head starts printing the image on the printing medium that is a printing target, in which the heating unit is made to perform heating so that a temperature of the printing head becomes a target temperature, wherein a first target temperature, which is the target temperature in the first heating process, is higher than a second target temperature, which is the target temperature in the second heating process, wherein in a case where the temperature of the printing head is lower than the second target temperature at a predetermined timing after the first heating process, the control unit performs the second heating process and then the printing head prints the image, and wherein in a case where the temperature of the printing head is not lower than the second target temperature at the predetermined timing after the first heating process, the control unit does not perform the second heating process and then the printing head prints the image.

2. The printing apparatus according to claim 1, further comprising:

a paper feeding unit configured to feed the printing medium;

a conveyance unit configured to convey the fed printing medium to a region where the printing can be performed by the printing head; and a movement unit configured to move a carriage on which the printing head is mounted.

3. The printing apparatus according to claim 2, wherein the control unit controls the first heating process or the second heating process to be performed in a period where the movement of the carriage performed by the movement unit and the feeding of the printing medium performed by the paper feeding unit or the conveyance of the printing medium performed by the conveyance unit are not performed simultaneously.

4. The printing apparatus according to claim 2, wherein the first heating process is the last heating process among the heating processes that are executed before a completion of a process of conveying the printing medium to a position where the printing head can print the image.

5. The printing apparatus according to claim 2, wherein, before the printing of the image on the printing medium that is the printing target is started, the movement unit moves the carriage to a standby position for the printing head to print the image.

6. The printing apparatus according to claim 5, wherein, after the first heating process ends, the movement unit moves the carriage to the standby position of the printing head.

7. The printing apparatus according to claim 5, wherein the second heating process is executed after the carriage is moved to the standby position.

8. The printing apparatus according to claim 5, wherein the standby position is a position where the printing head can perform preliminary ejection.

9. The printing apparatus according to claim 2, comprising at least one motor, wherein at least an operation of feeding the printing medium and an operation of conveying the fed printing medium can be executed with the motor.

10. The printing apparatus according to claim 1, wherein the first target temperature is set based on (1) an amount of temperature drop which occurs in the printing head in a period between an end of the first heating process and a start of the printing of the image by the printing head and (2) a temperature of the printing head to be achieved for the start of the printing of the image.

11. The printing apparatus according to claim 1, wherein the second target temperature is set based on (1) an amount of temperature drop which occurs in the printing head in a period between an end of the second heating process and a start of the printing of the image by the printing head and (2) a temperature of the printing head to be achieved for the start of the printing of the image.

12. The printing apparatus according to claim 1, wherein the control unit counts a total number combining the number of times the heating is performed in a predetermined time period and the number of times waiting is performed without the heating of the printing head in the first heating process and if the total number exceeds a predetermined value, the control unit cancels the first heating process even in a case where the temperature of the printing head is lower than the first target temperature.

13. The printing apparatus according to claim 12, wherein the control unit determines whether or not the first heating process is cancelled, and controls the second heating process to be performed in a case where it is determined that the first heating process is cancelled.

14. The printing apparatus according to claim 12, wherein the second target temperature in the case where the first heating process is cancelled is set to a temperature lower than the second target temperature in the case where the first heating process is not cancelled.

15. The printing apparatus according to claim 1, wherein the printing head is an inkjet printing head in a thermal system in which heat energy generated by a heating element is utilized for ejecting ink, and wherein the heating unit heats the printing head by making the heating element generate heat energy to an extent that does not cause ink to be ejected.

16. A control method of a printing apparatus, the printing apparatus including (1) a printing head configured to print an image by ejecting ink to a printing medium that has been conveyed and (2) a heating unit configured to heat the printing head, the control method comprising:

performing a selected one of (1) a first heating process and (2) the first heating process and a second heating process, each of the first heating process and the second heating process being a process in which the heating unit is made to perform heating so that a temperature of the printing head becomes a target temperature, wherein a first target temperature, which is the target temperature in the first heating process, is higher than a second target temperature, which is the target temperature in the second heating process, wherein in a case where the temperature of the printing head is lower than the second target temperature at a predetermined timing after the first heating process, the second heating process is performed in the performing and then the printing head prints the image, and wherein in a case where the temperature of the printing head is not lower than the second target temperature at the predetermined timing after the first heating process, the second heating process is not performed in the performing and then the printing head prints the image.

17. A non-transitory computer-readable storage medium storing a program which causes a computer to perform a control method of a printing apparatus, the printing apparatus comprising (1) a printing head configured to print an image by ejecting ink to a printing medium that has been conveyed and (2) a heating unit configured to heat the printing head, the control method comprising:

performing a selected one of (1) a first heating process and (2) the first heating process and a second heating process, each of the first heating process and the second heating process being a process in which the heating unit is made to perform heating so that a temperature of the printing head becomes a target temperature, wherein a first target temperature, which is the target temperature in the first heating process, is higher than a second target temperature, which is the target temperature in the second heating process, wherein in a case where the temperature of the printing head is lower than the second target temperature at a predetermined timing after the first heating process, the second heating process is performed in the performing and then the printing head prints the image, and wherein in a case where the temperature of the printing head is not lower than the second target temperature at the predetermined timing after the first heating process, the second heating process is not performed in the performing and then the printing head prints the image.

* * * * *